United States Patent
Sabouri et al.

(10) Patent No.: US 6,999,743 B2
(45) Date of Patent: *Feb. 14, 2006

(54) LINE INTERFACE WITH SECOND ORDER HIGH PASS TRANSFER FUNCTION

(75) Inventors: Faramarz Sabouri, Lawrenceville, NJ (US); John P. Guido, Bethlehem, PA (US)

(73) Assignee: Analog Devices, Inc., Norwood, MA (US)

( * ) Notice: Subject to any disclaimer, the term of this patent is extended or adjusted under 35 U.S.C. 154(b) by 100 days.

This patent is subject to a terminal disclaimer.

(21) Appl. No.: 10/059,484

(22) Filed: Jan. 29, 2002

(65) Prior Publication Data

US 2003/0109239 A1 Jun. 12, 2003

Related U.S. Application Data

(60) Provisional application No. 60/338,864, filed on Dec. 7, 2001.

(51) Int. Cl.
*H04B 1/10* (2006.01)

(52) U.S. Cl. ............... 455/307; 455/280; 455/282; 379/399.1

(58) Field of Classification Search ........... 455/296, 455/333–341, 303–316, 130, 289–293, 280–282, 455/78–80; 375/258, 220, 229, 222, 285, 375/377; 329/402, 390.64, 399.01; 330/188–189, 330/196, 165–167; 333/32, 177; 379/399.1

See application file for complete search history.

(56) References Cited

U.S. PATENT DOCUMENTS

| | | | | |
|---|---|---|---|---|
| 5,245,654 | A | * | 9/1993 | Wilkison et al. ............ 379/405 |
| 5,528,630 | A | * | 6/1996 | Ashley et al. .............. 375/258 |
| 5,809,072 | A | * | 9/1998 | Zortea et al. ............... 375/232 |
| 6,028,487 | A | * | 2/2000 | Kakuta et al. .............. 330/311 |
| 6,044,110 | A | * | 3/2000 | Yiu ........................... 375/229 |
| 6,681,012 | B1 | * | 1/2004 | Gorcea et al. .............. 379/402 |

* cited by examiner

*Primary Examiner*—Pablo N. Tran
(74) *Attorney, Agent, or Firm*—Gauthier & Connors

(57) ABSTRACT

A transceiver system is disclosed for use in a telecommunication system. The transceiver system includes a transmission circuit including a differential transmitter input coupled to a differential input of a transmission amplifier, a receiver circuit including a differential receiver output coupled to a differential output of a receiver amplifier, and a transmission line interface circuit that is coupled to a differential output of the transmission amplifier and to a differential input of the receiver amplifier. The transmission line interface circuit providing a second order high pass transfer function.

10 Claims, 1 Drawing Sheet

LINE INTERFACE WITH SECOND ORDER HIGH PASS TRANSFER FUNCTION

This application claims priority to U.S. Provisional Patent Application Ser. No. 60/338,864 filed Dec. 7, 2001.

BACKGROUND OF THE INVENTION

The present invention generally relates to the field of transceivers for telecommunication systems, and particularly relates to transceivers for telecommunications that are efficient and inexpensive to produce.

Transceivers for telecommunication systems typically include a transmit path and a receive path. The transmit path typically includes a transmitter amplifier stage and a line driver and receive path typically includes a receiver amplifier stage that is coupled to the transmission line.

As telecommunication systems continue to become smaller and more ubiquitous, there continues to be a need for a transceiver circuit that is efficient and inexpensive to produce. There is also a need for a transceiver circuit that reduces required surface area in printed circuit boards. There is further a need for a transceiver circuit that provides reduced power consumption.

SUMMARY OF THE INVENTION

A transceiver system is disclosed for use in a telecommunication system. The transceiver system includes a transmission circuit including a differential transmitter input coupled to a differential input of a transmission amplifier, a receiver circuit including a differential receiver output coupled to a differential output of a receiver amplifier, and a transmission line interface circuit that is coupled to a differential output of the transmission amplifier and to a differential input of the receiver amplifier. The transmission line interface circuit provides a second order high pass transfer function.

BRIEF DESCRIPTION OF THE DRAWINGS

The following description may be further understood with reference to the accompanying drawing in which.

DETAILED DESCRIPTION OF THE INVENTION

Figure 1:
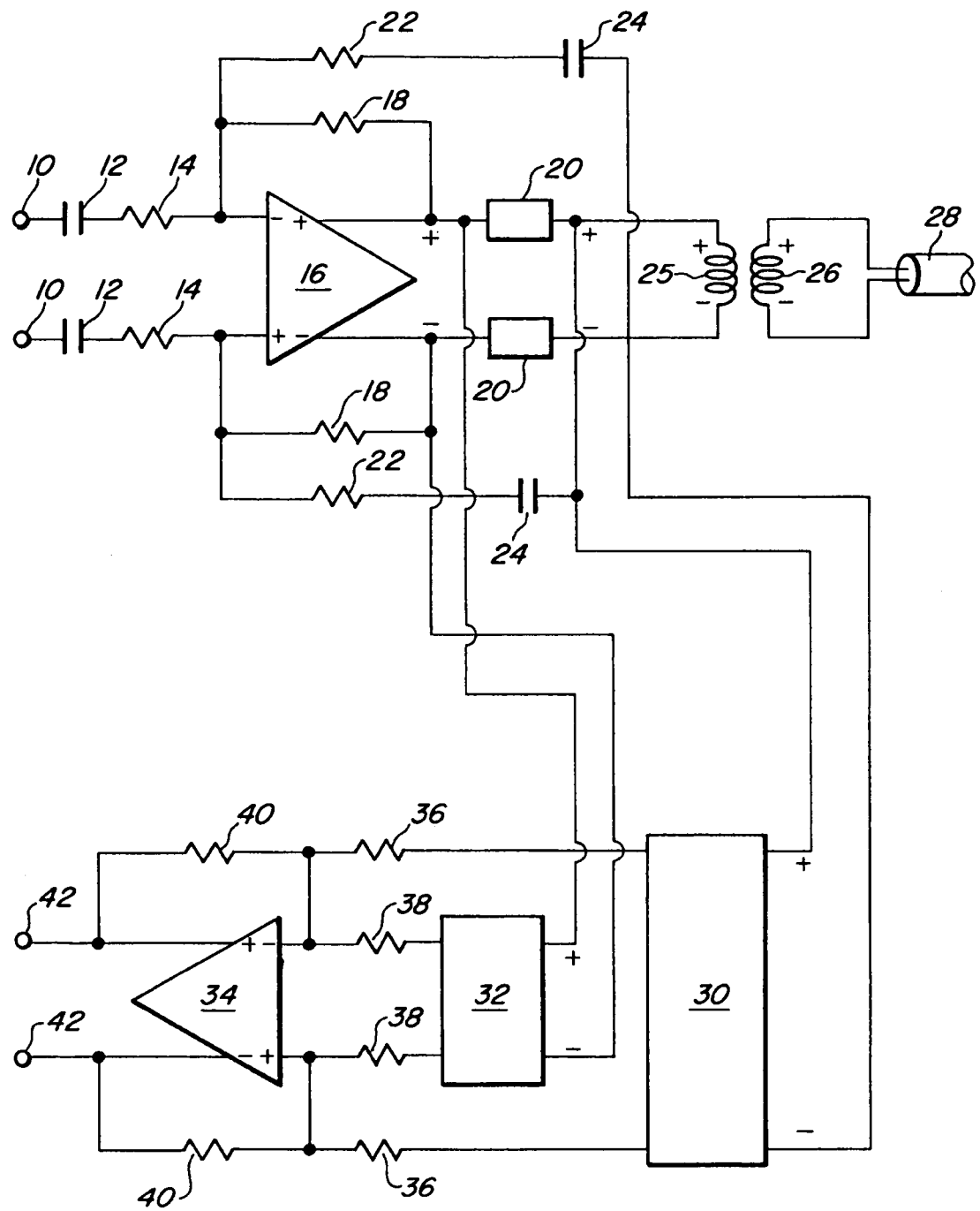
FIG. 1 shows an illustrative view of a transceiver circuit in accordance with an embodiment of the invention. The drawing is shown for illustrative purposes.

The invention provides an architecture for a line interface including a transmit path and a receive path. The transmit path includes a line driver and a two-matching impedance network that terminates the line. The transmit path provides a second-order high pass transfer function. The voltage across the matching network is bootstrapped to the receive signal through a negative and a positive feedback so that the terminating impedance appears much larger than its actual value from the point of view of the receiver. The matching impedance, on the other hand, manifests itself as a small impedance to the transmit signal and as a result, dissipates only a small fraction of the transmit power. Circuits of the invention provide that the transfer function of the line driver is shaped as a second-order high pass filter to reject the out-of-band noise and distortion components when needed.

The receive path includes a hybrid network and a difference amplifier. The hybrid network acts as a selective filter and prevents the transmit signal from leaking into the receive path, thereby limiting the dynamic range. The difference amplifier subtracts the signal across the line from a replica of the transmit signal in order to reject the transmit signal and amplify the received signal from the line.

The invention provides, in an embodiment, a full rate asymmetric digital subscriber line (ADSL) modem to be used for the central office in a telecommunication transceiver circuit. Systems of the invention, however, may be used for a variety of other applications.

The line driver architecture of the invention provides matched output impedance to the line and achieves a high-efficiency operation. It may be implemented in a single-ended or fully differential architecture and may be used with voltage or current feedback amplifiers. The two matching impedances together typically provide about 10% of the line characteristic impedance.

As shown in FIG. 1, a transceiver circuit in accordance with an embodiment of the invention for use as a modem front end includes a transmission path and a receive path. The transmission path includes a pair of capacitors 12 ($C_1$) and a pair of resistors 14 ($R_1$) in the input path from a transmission input port 10 to a transmitter amplifier 16. A first feedback path from the output of the amplifier 16 includes a pair of resistors 18 ($R_2$). The output of the amplifier 16 is serially passed through a pair of matching impedances 20 (each $Z_M/2$), and a second inverted amplifier feedback path from the output of the impedances 20 includes another pair of resistors 22 ($R_3$) as shown. The circuit is coupled to a transmission line 28 via transformer windings 25 and 26.

The receive path of the transceiver circuit of FIG. 1 includes a first filter 32 that is coupled to the output of the amplifier 16, and a second filter 30 that is connected across the matching impedances 20. The outputs of the second filter 30 are input to a receiver amplifier 34 through series resistors 36 ($R_4$), and the outputs of the first filter 32 are input to the amplifier 34 through series resistors 38 ($R_5$). The negative feedback path from each input to each output of the amplifier 34 includes a series resistor 40 ($R_6$), and the output of the amplifier 34 is provided to a receiver output port 42 as shown.

The transceiver circuit includes, therefore, a fully differential voltage feedback implementation of a line driver, a single transformer hybrid, two matching impedances and a receive path amplifier. The dual feedback network boosts the small impedance of the matching networks ($Z_M/2$) to a much larger line driver output impedance to match the characteristic impedance of the transmission line. Matched termination of the line improves transmission efficiency for the received signal. While the matching impedance manifests itself significantly larger to the received signal path, it appears with its actual value for the transmit signal. As a result, by using a small matching impedance, only a small fraction of the total power is consumed by the matching impedance and an efficient operation is achieved.

Resistors 14, 18 and 22 set the gains from the input voltage ($V_{IN}$) at ports 10 to the output of the operational amplifier 16 ($V_{OPAMP}$) and also to the voltage across the line ($V_{LINE}$). The received signal from the line appears across the transformer primary. In addition, the transmit signal appears across the same windings. When the matching impedance ($Z_M$) is a fraction of the line impedance ($Z_L$), there is a unique linear combination of the voltages across the amplifier 16 output ($V_{OPAMP}$) and the transformer primary ($V_{PRI}$) which leads to complete rejection of the transmit echo from the receive path. The same signal path is used by the signal received from the line to reach the receive amplifier. The received signal usually faces some attenuation that should be compensated by low noise amplification in the receive path. Capacitors 12 and 24 in FIG. 1 implement a second order high pass filter function at no additional cost, noise or power consumption. The addition of capacitors 24 to the positive feedback of this amplifier provides a useful method of implementing a high pass transfer function.

The ratio of the matching impedance to the line characteristic impedance is provided by:

$$k = Z_M/(Z_L')$$

where $Z_L' = Z_L/N^2$ is the total reflected line impedance as seen from the primary side of the transformer. The matching impedance $Z_M$ is split into two impedances, each with half the impedance expressed in the above equation. The impedance of the matching network is optimized to match the characteristic impedance of the line times a scaling factor.

The voltage gain from the input to the output of the amplifier 16 (excluding the filter capacitors) is provided by:

$$\frac{V_{OPAMP}}{V_{IN}} = -\frac{R_2}{R_1} \frac{1}{1 - \frac{1}{k+1}\frac{R_2}{R_3}}$$

The voltage gain from the input to the line (again excluding the filter capacitors) is provided by:

$$\frac{V_{LINE}}{V_{IN}} = \frac{N}{k+1} \frac{V_{OPAMP}}{V_{IN}}$$

For optimal hybrid rejection of the transmit signal and to amplify the received signal from the line, the linear combination of $V_{OPAMP}$ and $V_{PRI}$ is provided by:

$$V_{RX} = AV_{OPAMP} - V_{PRI}$$

where $V_{RX}$ is the voltage at the receiver output 42. The optimum gain A for complete rejection of the transmit signal is:

$$A = \frac{1}{k+1}$$

In the receive path where A is also the gain of the receive amplifier set by the value of the resistors 40 ($R_6$) the gain may be expressed as:

$$\frac{V_{RX}}{V_{LINE}} = \left(\frac{AR_2}{R3} - 1\right)/N$$

The output impedance of the line driver as seen from the line may be expressed as:

$$Z_i = (N^2 Z_M)/(1 - R_2/R_3)$$

In order to match the output impedance of the line driver to the line characteristic impedance $Z_L$, the following relationship must exist:

$$\frac{R_2}{R3} = 1 - k$$

The capacitors 12 and 24 form a second order high pass transfer function for the line driver. Capacitors 12 ($C_1$) form a zero at zero and a pole at $P_1 = -1/(R_1C_1)$. Capacitors 24 ($C_2$) form a zero at $z = -1/(R_3C_2)$ and a pole at $$p_2 = \frac{-1}{\left(R_3 - \frac{R_2}{k+1}\right)C_2}$$

Zero z is at a much smaller frequency than $p_2$. The transfer function of the line driver configured as a $2^{nd}$-order high pass filter is provided by:

$$\frac{V_{OPAMP}}{V_{IN}} = \frac{R_2 C_1 s(1 + R_3 C_2 s)}{(1 + R_1 C_1 s)\left[1 + \left(R_3 - \frac{R_2}{k+1}\right)C_2 s\right]}$$

Therefore, even if the optimum gain discussed above could not be met due to complex characteristic impedance of a transmission line, the second order high pass characteristic shown above still appears in the transfer function from the input ($V_{IN}$) to the receive path input ($V_{RX}$).

The receive path of the line interface consists of two filters and a difference amplifier. For a transmission line with well defined characteristic impedance, the impedance of the matching network should be simply a scaled reflected-to-primary impedance ($Z_L'$) of transmission line. For such a well-behaved case, constructing a simple matching network is routine, and as long as the above equation for the gain is valid the hybrid rejection is perfect. The four input difference amplifier shown in FIG. 1 without the input filters implements the relationship for the equation of $V_{RX}$ above by setting appropriate values for the input resistors.

If the self inductance of the transformer winding makes an impedance comparable to the reflected line impedance ($Z_L'$), an inductor should be placed in parallel with the above matching impedance as well. The matching impedance should be:

$$Z_M = k(Z_L' \| 4L_1 s)$$

where $L_1$ is the inductance of each primary of the transformer when the other two windings are left open as shown in FIG. 1.

The characteristic impedance of many transmission lines are not always well defined. For example, with a twisted pair telephony transmission line, the characteristic impedance may vary depending on the wire gauge, the length of the line and the number of bridge taps. Realization of an impedance network with perfect matching to all the lines is not always possible. In order to achieve reasonable transmit signal rejection from the receive path, the voltage across the matching impedance may be filtered as shown in FIG. 1.

Those skilled in the art will appreciate that numerous modifications and variations may be made to the above disclosed embodiments without departing from the spirit and scope of the invention.

What is claimed is:

1. A transceiver system for use in a telecommunication system, said transceiver system comprising:
   a transmission circuit including a differential transmitter input coupled to a differential input of a transmission amplifier;
   a receiver circuit including a differential receiver output coupled to a differential output of a receiver amplifier; and
   a transmission line interface circuit coupled to a differential output of said transmission amplifier and to a differential input of said receiver amplifier, said transmission line interface circuit providing a second order high pass transfer function.

2. The transceiver system as claimed in claim 1, wherein said transmission line interface circuit includes two matching impedances, each of which is connected in series in a feedback path of the transmission amplifier.

3. The transceiver system as claimed in claim 1, wherein said transmission circuit includes a pair of capacitors, each of which is in a positive feedback path of said transmission amplifier.

4. A transceiver system for use in a telecommunication system, said transceiver system comprising:
   a transmission circuit including a differential transmitter input coupled to a differential input of a transmission amplifier;
   a receiver circuit including a differential receiver output coupled to a differential output of a receiver amplifier; and
   a transmission line interface circuit coupled to a differential output of said transmission amplifier and to a differential input of said receiver amplifier, said transmission line interface circuit including two pairs of feedback paths for said transmission amplifier, two of which feedback paths include capacitors.

5. The transceiver system as claimed in claim 4, wherein said transmission circuit includes two matching impedances, each of which is connected in series with one of each path in the differential output of the transmission amplifier.

6. The transceiver system as claimed in claim 4, wherein said transmission circuit includes two matching impedances, each of which is connected in series with one of said two pairs of feedback paths of said transmission amplifier.

7. The transceiver system as claimed in claim 6, wherein said matching impedances are connected in series with said feedback paths that include capacitors.

8. A transceiver system for use in a telecommunication system, said transceiver system comprising:
   a transmission circuit including a differential transmitter input coupled to a differential input of a transmission amplifier, said transmission circuit including a pair of first high pass transfer elements in a transmitter input path, and said transmission amplifier being coupled to a pair of positive feedback paths, each of which includes a second high pass transfer unit;
   a receiver circuit including a differential receiver output coupled to a differential output of a receiver amplifier; and
   a transmission line interface circuit coupled to a differential output of said transmission amplifier and to a differential input of said receiver amplifier, said transmission line interface circuit providing a second order high pass transfer function via the pairs of first and second high pass transfer elements.

9. The transceiver system as claimed in claim 8, wherein said first high pass transfer elements each includes a capacitor.

10. The transceiver system as claimed in claim 8, wherein said second high pass transfer elements each includes a capacitor.

* * * * *